United States Patent [19]
Takada

[11] 3,741,495
[45] June 26, 1973

[54] AUTOMATIC LOCKING RETRACTOR SYSTEM WITH STOPPER DEVICE
[75] Inventor: Takezo Takada, Hikone, Japan
[73] Assignee: Takata Kojyo Co., Ltd., Tokyo, Japan
[22] Filed: June 16, 1971
[21] Appl. No.: 153,784

[52] U.S. Cl. ............................................. 242/107.4
[51] Int. Cl. ............................................ A62b 35/00
[58] Field of Search .................. 242/107 R, 107 SB, 242/107.4, 107.5, 107.6, 107.7; 297/388; 280/150 SB

[56] References Cited
UNITED STATES PATENTS
| | | | |
|---|---|---|---|
| 3,635,420 | 1/1972 | Romanzi, Jr. | 242/107.4 |
| 3,338,532 | 8/1967 | Board et al. | 242/107.4 |
| 3,384,415 | 5/1968 | Monroe | 242/107.4 X |
| 3,512,730 | 5/1970 | Board et al. | 242/107.4 |

Primary Examiner—Werner H. Schroeder
Attorney—Stanley Wolder

[57] ABSTRACT

A safety belt retractor mechanism in which the belt may be locked in any selected position against withdrawal and retraction includes a reel upon which the belt is wound and which is spring biased in a belt retraction direction. A coaxial toothed wheel rotates with the reel and a rockable locking member is spring biased into locking engagement with a tooth. A first control member is rotatably mounted on the reel shaft and is spring biased to urge the locking member to a wheel tooth disengage position and responds to a pull on the belt to release the locking member to a tooth engage position. A second control member is engaged by the reel shaft through a slipping clutch to swing in the direction of rotation of the shaft to retain the locking member in a disengaged position with the belt withdrawal rotation of the reel and to release the locking member with the belt retraction rotation of the reel.

6 Claims, 3 Drawing Figures

PATENTED JUN 26 1973　　3,741,495

INVENTOR.
TAKEZO TAKADA

BY Stanley Wolder
ATTORNEY

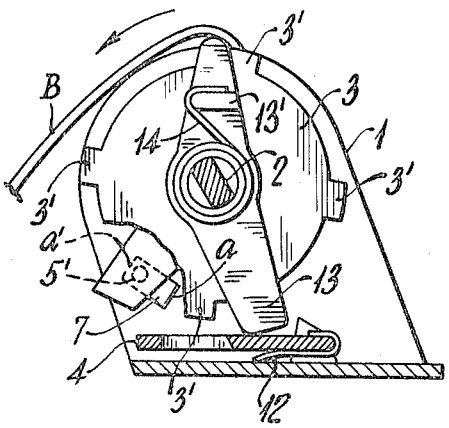
Fig.2. (a)
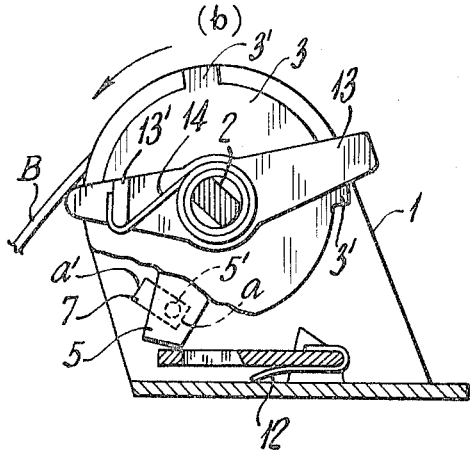
(b)
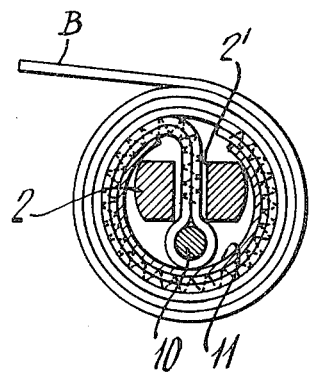
Fig.3.
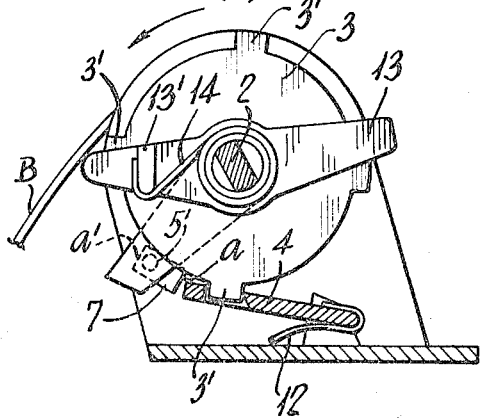
(c)
INVENTOR
TAKEZO TAKADA
BY Stanley Wolder
ATTORNEY

AUTOMATIC LOCKING RETRACTOR SYSTEM WITH STOPPER DEVICE

BACKGROUND OF THE INVENTION

The present invention relates generally to improvements in vehicle safety belt mechanisms and it relates particularly to an improved safety belt mechanism of the type provided with a belt retracting or windup reel.

The conventional safety belt has one end anchored and extends from the anchored end so that when it is not in use it is freely movable so as to be randomly located generally in a disorderly manner. As a consequence, this arrangement is highly inconvenient, unattractive and frequently hazardous and the belt is difficult to locate for use. To overcome the aforesaid drawbacks, spring biased belt rewind reels have been available and proposed to withdraw the released belt into a housing. However, when these retraction reels are employed there is a high retraction force on the belt which is transmitted to the passenger, or seat occupant as an oppressive force with its resulting discomfort and mobility limitation and these reels when they are adjustable are so adjustable only with difficulty and are unreliable.

SUMMARY OF THE INVENTION

It is a principal object of the present invention to provide an improved safety belt mechanism.

Another object of the present invention is to provide an improved vehicle safety belt retraction reel.

Still another object of the present invention is to provide an improved safety belt retraction reel which does not apply any oppressive force to the wearer and is easily adjustable.

A further object of the present invention is to provide a mechanism of the above nature characterized by its reliability, ruggedness, simplicity and ease of operation.

The above and other objects of the present invention will become apparent from a reading of the following description taken in conjunction with the accompanying drawings which illustrate a preferred embodiment thereof.

In a sense the present invention contemplates the provision of a safety belt mechanism comprising a reel spring loaded to rotate in a belt retracting direction, a belt wound on the reel and withdrawable therefrom to load the reel spring and urged to a retracted position by the reel, means movable between a reel braking and reel release condition for locking the reel against rotation in a belt withdrawal and in belt retraction direction and spring urged to a locking position, a first control means for alternatively urging the braking means to its lock and release positions and spring urged to actuate the braking means to its release position and responsive to a pull on the belt to release the braking means to its reel lock position, and a second control means for alternately locking the braking means in its release position and releasing the braking means to its braking position and responsive to the rotation of the reel in a belt withdrawal and belt retraction direction to respectively lock the brake means in its release condition and to release the brake means to its locking condition.

In the preferred form of the improved mechanism the reel includes a shaft which is journalled in a pair of upright arms of a U-shaped bracket and is urged in a belt retraction direction by a spiral spring supported on a bracket arm. The braking means includes a coaxial radially toothed wheel secured to the shaft and a swingable brake member provided with spaced shoulders and spring biased to swing it to bring the shoulders into registry with opposite sides on one of the teeth and prevent rotation of the reel. The first control means includes a U-shaped lever swingably supported on the shaft and provided with a longitudinally extending arm which is swingable with the lever between first and second positions engaging the brake member to disengage it from the wheel teeth and releasing the braking member respectively and a spring urges the lever to the first position and the cross arm of the lever engages the inside face of the belt proximate the reel to swing the lever to its second position by a predetermined pull on the belt. The second control means includes an arm slip clutch mounted on the reel shaft so as to retract the braking member from its braking position with the belt withdrawal rotation of the shaft and to release the braking member with the belt retraction rotation of the reel shaft.

With the improved mechanism the belt is positively locked against withdrawal and retraction in any desired extended position and the belt may be easily adjusted in length or retracted by a simple manipulation of the belt. The mechanism is reliable, rugged, simple and versatile.

BRIEF DESCRIPTION OF THE DRAWINGS

FIG. 2(a) (b) and (c) are transverse sectional views of the mechanism illustrating it in an unbraked condition, at a point in its braking sequence, and in a braked condition respectively; and FIG. 3 is a transverse sectional view of the belt wound reel.

DESCRIPTION OF THE PREFERRED EMBODIMENT

Figure 1:
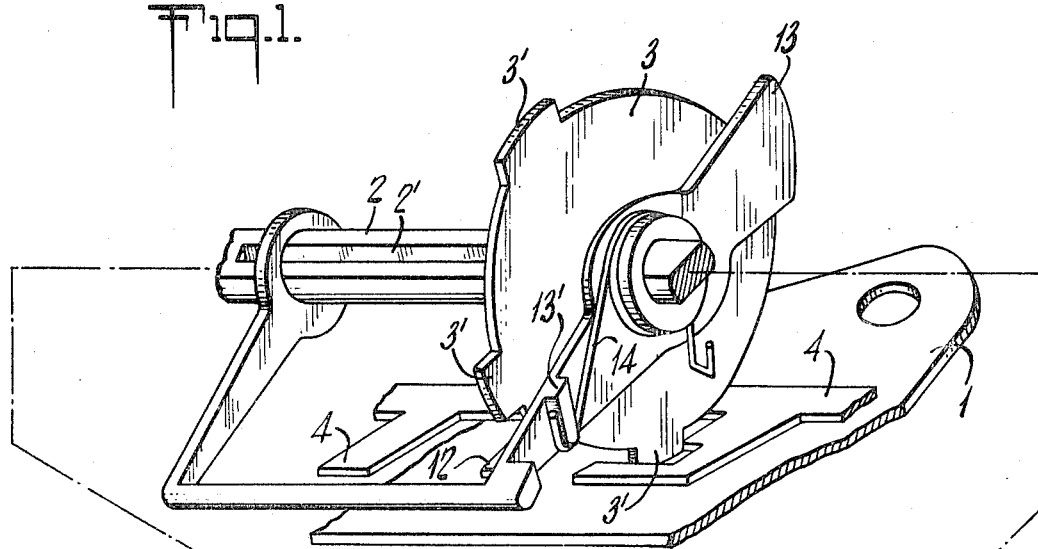
FIG. 1 is an exploded perspective view of a belt retractor mechanism embodying the present invention.
Figure 1:
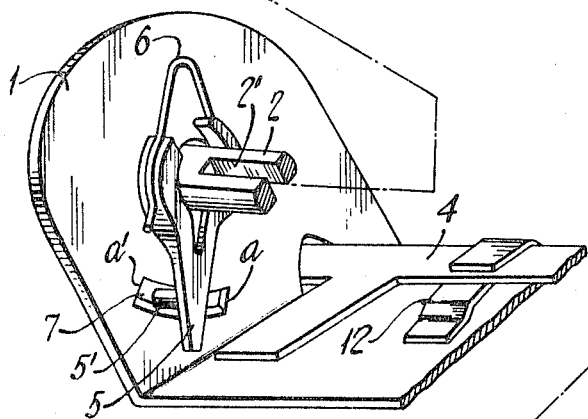
Figure 1:
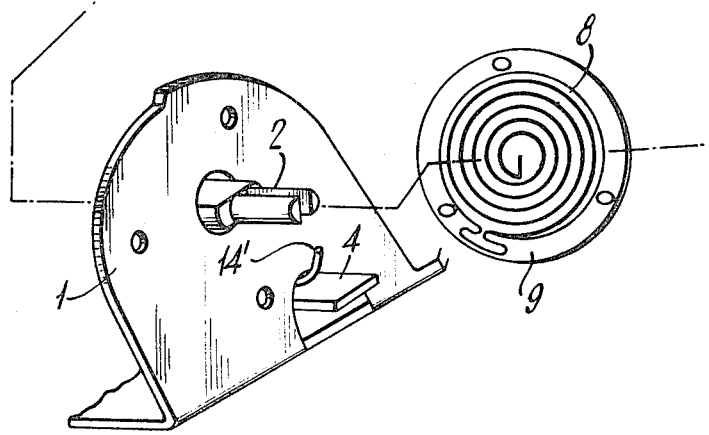

Referring now to the drawings which illustrate a preferred embodiment of the present invention, the reference numeral 1 generally designates a U-shaped mounting bracket having a flat cross-piece and laterally spaced upstanding side arms. A reel defining shaft 2 extends between and is journalled in circular openings in the bracket side arms and is provided with a longitudinal slot 2' and terminates at one end in a slotted section projecting beyond the corresponding bracket side arm.

As shown in FIG. 3 a belt B is wound about shaft 2 and its inner end is looped and projects through slot 2' and a pin 10 engages the belt loop to anchor the inner end of the belt B to shaft 2. As viewed in FIGS. 2 and 3 belt B is wound counterclockwise about shaft 2 to rotate the shaft counterclockwise with withdrawal of the belt, the clockwise rotation of shaft 2 retracting belt B. A split sleeve 11 surrounds shaft 2 and the inner end of belt 2 and functions as a winding core for belt B.

A spiral rewind spring 8 is positioned adjacent the outside face of a bracket side arm and encircles the projecting end of shaft 2 and includes a bent inner end which engages the slot formed in the shaft end section. The outer end of the spring 8 abuts a stop section positioned on a cover member affixed to the bracket side arm and covering the spring 8. The spring 8 is so wound as to urge shaft 2 to rotate in a clockwise direction to retract belt B, and to be wound and loaded counterclockwise with the withdrawal of belt B.

Affixed to and rotatable with shaft 2 and spaced inwardly of the inside face of a bracket side arm is a wheel or disc 3 provided with a plurality of peripherally spaced outwardly directed radial teeth 3' having concentric outer edges and loading and trailing radial shoulders. Cooperating with the toothed wheel 3 is a swingable brake member 4 which includes a cross piece having opposite ends rockably engaging apertures in the bases of the bracket side arms and forwardly projecting coplanar left hand and right hand arms (as viewed in FIG. 1). The right hand arm is provided at its distal end with a recess which is adapted to engage a tooth 3' with the upward swinging of the right hand arm and prevent the rotation of wheel 3 and shaft 2 in either direction and to release the tooth 3' with the depressing of the brake member arm to permit the rotation of wheel 3 and shaft 2. The raising and lowering of the brake member left hand arm likewise effects the braking and releasing of wheel 3 and shaft 2. A shaped leaf spring 12 engaging the brake member cross piece and bearing on the bracket cross piece resiliently urges the brake member 4 to swing upwardly to a braking position engaging a tooth 3'.

A first brake control means comprises a yoke member 13 having a transversely extending belt sensing crosspiece and radially extending left hand and right hand side arms provided at points equidistant from the crosspiece with circular openings engaging shaft 2 to permit the rotation of yoke 13 about shaft 2. The yoke right hand arm projects radially beyond shaft 2 on the other side of the crosspiece and is disposed between the wheel 3 and the proximate bracket side arm and terminates at its outer end in a cam edge. A hairpin spring 14 includes a coiled intermediate section encircling a collar on shaft 2, a first arm terminating in a hook section engaging the underface of abutment 13' formed on the yoke right hand arm proximate the crosspiece and a second arm terminating in a hook section which engages the edge of an aperture formed in the bracket side arm. The spring 14 normally resiliently urges yoke member 13 to swing to a clockwise position with the cross piece being uppermost and engaging the underface of belt B above shaft 2 and with the yoke cam edge bearing on the brake member right hand arm to depress the arm out of engagement with the toothed wheel 3 as seen in FIG. 2. By applying sufficient withdrawal tension on belt B the yoke 13 is swung counterclockwise against the bias of spring 14 to release brake member 4 and permit it to swing into engagement with a tooth 3'.

A second brake control means includes a control arm 5 provided at its upper end with an integrally formed split collar engaging shaft 2 above the brake member left hand arm adjacent the proximate bracket side arm. The opposing sections of the control arm collar are resiliently urged into frictional slipping engagement with shaft 2 by a wire spring 6 clamping the collar arms to provide a slipping clutch coupling between the arm 5 and shaft 2. A pin 5' projects laterally from the arm 5 into sliding engagement with a curved slot 7 formed in the bracket side arm to limit the swinging of the free end of arm 5 by the end shoulders a and a' of slot 7 between positions overlying the free end of the brake member left hand arm and a point beyond the free end. Thus, the belt withdrawal rotation of shaft 2 swings arm 5 toward a position overlying the brake arm and the belt retraction rotation of shaft 2 swings the arm 5 out of registry with the brake arm.

Considering now the operation of the safety belt retraction mechanism described above, in its rest, belt fully retracted position the mechanism is in the condition illustrated in FIG. 2(a) with the cam edge of lever yoke 13 bearing on brake member 4 to depress it out of engagement with toothed wheel 3 and with arm 5 being swung clockwise out of registry with the brake member left hand arm. In applying the belt B, the passenger pulls on the belt to rotate shaft 2 counterclockwise which swings the second control member arm 5 into registry with the brake member left hand arm thereby locking the brake member 4 in its retracted toothed wheel release position permitting the free withdrawal of belt B and to swing first control member 13 about 90°, as seen in FIG. 2(b) out of engagement with brake member 4. The belt B is then buckled and the tension or pull thereon shortly released to permit a clockwise rotation of shaft 2 by spring 8 thereby swinging the second control arm 5 out of engagement with the arm of brake member 4. The brake member 4 is then raised by spring 12 to engage a tooth 3' rotated into registry with the latching recess in braking member 4 and thereby locks the wheel 3 and shaft 2 against rotation in either direction and releasably locks belt B against retraction and withdrawal (as seen in FIG. 2(c)).

To effect the rewinding and retraction of belt B, it is unbuckled and released sufficiently to permit the first control member 13 to rotate clockwise under the influence of spring 14 to bear on and depress brake member 4. The depressed brake member 4 releases toothed wheel 3 and shaft 2 to rotate clockwise under the influence of spring 8 to retract and rewind belt B, to a condition of the mechanism as shown in FIG. 2(a). It should be noted that a slight loosening of belt B is insufficient to cause control member 13 to move from the position shown in FIG. 2(c) to a brake member depressing position as shown in FIG. 2(a), a swing of the control member from its fully retracted position of at least 60° being advantageously required to depress the brake member 4.

I claim:

1. A vehicle safety belt mechanism comprising a reel, a belt wound on said reel and withdrawable therefrom to rotate said reel in a first direction and being retracted and wound on said reel with the opposite rotation thereof in a second direction, spring means urging said reel to rotate in said second direction, braking means transferable between a first position locking said reel against rotation in said first and second directions and a second position releasing said reel for rotation in both directions, spring means urging said braking means toward said first position and first control means transferable between a first position urging said braking means to its second position and a second position releasing said braking means for movement to its first position, spring means urging said first control means to its first position, said first control means being transferable to its second position in response to a predetermined pull on said belt in a withdrawal direction.

2. The mechanism of claim 1 including second control means transferable between a first position locking said braking means in its second position in response to the rotation of said reel in said first direction and a second position releasing said braking means in response to the rotation of said reel in said second direction.

3. The mechanism of claim 2 wherein said braking means comprises a wheel rotatable with said reel and having peripherally spaced radially outwardly directed teeth, a brake member having a recess formed therein and being swingable between a first position in which said recess engages a registering tooth to restrict the movement thereof and a second position out of the path of said teeth, and spring means urging said brake member toward said first position.

4. The mechanism of claim 3 wherein said first control means comprises a first control arm swingable between its ends about the axis of said reel between a first position in which a first end of said control arm bears on said brake member to transfer it to its tooth releasing second position and a second position releasing said brake member, a sensing element projecting transversely from the other end of said arm into sliding engagement with the underface of said belt, and spring means urging said control arm toward its first position.

5. The mechanism of claim 4 wherein said second control means comprises a second control arm extending radially from said reel and in frictional slipping engagement therewith to swing in the direction of rotation of said reel, and means limiting the swinging of said second control arm between a first position engaging said brake member to lock it in its second position and a second position releasing said brake member with the rotation of said reel in its first and second directions respectively.

6. A vehicle safety belt mechanism comprising a reel, a belt wound on said reel and withdrawable therefrom to rotate said reel in a first direction and being retracted and wound on said reel with the opposite rotation thereof in a second direction, spring means urging said reel to rotate in said second direction, braking means transferable between a first position locking said reel against rotation in said first and second directions and a second position releasing said reel for rotation in both directions, spring means urging said braking means toward said first position, and control means transferable between a first position locking said braking means in its second position in response to the rotation of said reel in said first direction and a second position releasing said braking means in response to the rotation of said reel in said second direction.

* * * * *

UNITED STATES PATENT OFFICE
CERTIFICATE OF CORRECTION

Patent No. 3,741,495       Dated June 26, 1973

Inventor(s) TAKEZO TAKADA

It is certified that error appears in the above-identified patent and that said Letters Patent are hereby corrected as shown below:

--30 Foreign Application Priority Data

Japan    June 18, 1970....................45-59953

Signed and sealed this 6th day of August 1974.

(SEAL)
Attest:

McCOY M. GIBSON, JR.            C. MARSHALL DANN
Attesting Officer               Commissioner of Patents